US012726881B2

(12) United States Patent
Yang

(10) Patent No.: US 12,726,881 B2
(45) Date of Patent: Sep. 1, 2026

(54) RELAY DETERMINATION METHOD AND APPARATUS

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 18/579,913

(22) PCT Filed: Jul. 19, 2021

(86) PCT No.: PCT/CN2021/107197
§ 371 (c)(1),
(2) Date: Jan. 17, 2024

(87) PCT Pub. No.: WO2023/000150
PCT Pub. Date: Jan. 26, 2023

(65) Prior Publication Data

US 2024/0323803 A1 Sep. 26, 2024

(51) Int. Cl.

| | |
|---|---|
| ***H04W 40/22*** | (2009.01) |
| ***H04W 40/12*** | (2009.01) |
| ***H04W 48/20*** | (2009.01) |
| ***H04W 76/19*** | (2018.01) |

(52) U.S. Cl.
CPC ........... *H04W 40/22* (2013.01); *H04W 40/12* (2013.01); *H04W 48/20* (2013.01); *H04W 76/19* (2018.02)

(58) Field of Classification Search
CPC ..... H04W 40/22; H04W 40/12; H04W 24/08; H04W 76/19; H04W 48/20; H04W 8/005; H04W 88/04
See application file for complete search history.

(56) References Cited

U.S. PATENT DOCUMENTS

| | | | | |
|---|---|---|---|---|
| 2016/0204847 | A1 | 7/2016 | Ryu et al. | |
| 2020/0021355 | A1 | 1/2020 | Pinheiro et al. | |
| 2022/0159757 | A1 * | 5/2022 | Balasubramanian | H04L 5/0055 |
| 2023/0422144 | A1 * | 12/2023 | Zhao | H04W 76/14 |
| 2024/0049327 | A1 * | 2/2024 | Cai | H04W 76/19 |
| 2024/0147427 | A1 * | 5/2024 | Basu Mallick | H04W 68/005 |

(Continued)

FOREIGN PATENT DOCUMENTS

| | | | |
|---|---|---|---|
| CN | 107771410 | A | 3/2018 |
| CN | 108770074 | A | 11/2018 |
| WO | WO 2017/028743 | A1 | 2/2017 |

OTHER PUBLICATIONS

Office Action issued by the China State Intellectual Property Rights Bureau on Aug. 24, 2024, in corresponding Application No. CN 202180002128.X, 7 pages.

(Continued)

*Primary Examiner* — Congvan Tran
(74) *Attorney, Agent, or Firm* — Finnegan, Henderson, Farabow, Garrett & Dunner, L.L.P.

(57) ABSTRACT

A relay determination method is performed by a terminal device, and includes: determining a relay determination strategy of the terminal device according to state information of the terminal device; and determining a relay terminal device of the terminal device according to the relay determination strategy.

16 Claims, 4 Drawing Sheets

(56) References Cited

U.S. PATENT DOCUMENTS

2024/0179726 A1* 5/2024 Wang .................... H04W 72/25

OTHER PUBLICATIONS

Office Action issued by the Patent Office of the Russian Federation Federal Institute of Industrial Property on Aug. 8, 2024, in corresponding Application No. RU 2024102861/07, 6 pages.
Notice of Reasons for Refusal issued by the Japanese Patent Office on Dec. 24, 2024, in corresponding Application No. JP 2024-502696, 9 pages.
"Discussion on Relay selection in Sidelink relay", ZTE, Sanechips, 3GPP TSG-RAN WG2 Meeting #114 electronic, R2-2104977, Online, May 19-27, 2021, 9 pages.
3rd Generation Partnership Project; Technical Specification Group Radio Access Network; Study on NR sidelink relay; (Release 17), 5G A Global Initiative, 3GPP TR 38.836 V17.0.0 (Mar. 2021) Technical Report, 4 pages.
"Summary of [AT113bis-e][610][Relay]AS criteria for relay (re)selection (InterDigital)", InterDigital, 3GPP TSG-RAN WG2 Meeting #113bis-e, R2-2104414, Online, Apr. 12-20, 2021, 25 pages.
International Search Report and Written Opinion of International Application No. PCT/CN2021/107197, dated Dec. 10, 2021, 18 pages.
Catt, Remains Issues on Relay (Re)selection, 3GPP TSG-RAN WG2 Meeting #114-e, R2-2104747, Electronic, May $19^{th}$—$27^{th}$, 2021, 4 pages.

* cited by examiner

RELAY DETERMINATION METHOD AND APPARATUS

CROSS-REFERENCE TO RELATED APPLICATION

This application is a U.S. national phase application of International Patent Application No. PCT/CN2021/107197, filed on Jul. 19, 2021, the entire contents of which are incorporated herein by reference.

FIELD

The present disclosure relates to the field of mobile communications, and more particularly to a relay determination method, and relay determination apparatus.

BACKGROUND

A relay technology means that a terminal device does not communicate with a network device directly, but communicates with a network device through relay of another terminal device. Coverage of a wireless network may be extended through the relay technology, eliminating or reducing communication blind spots, and obtaining a higher link capacity. A terminal device connected to a network device via another terminal device is referred to as a remote terminal device, and a terminal device providing a relay function is referred to as a relay terminal device.

In the related art, in order to ensure service continuity when a remote terminal device moves in different cells, the remote terminal device generally selects a relay terminal device via a serving cell to which the remote terminal device belongs. When the remote terminal device is in a disconnected state, the service continuity is not required. At this time, the relay terminal device is still selected according to the serving cell to which the remote terminal device belongs, and communication performance is degraded.

SUMMARY

A first aspect of embodiments of the present disclosure provides a relay determination method, which is performed by a terminal device. The method includes determining a relay determination strategy of the terminal device according to state information of the terminal device, and determining a relay terminal device of the terminal device according to the relay determination strategy.

A second aspect of embodiments of the present disclosure provides a relay determination device. The relay determination device includes a processor, and an interface circuit configured to receive code instructions and transmit the code instructions to the processor. The processor is configured to run the code instructions to perform the method described in the embodiments of the first aspect.

A third aspect of embodiments of the present disclosure provides a communication device. The communication device includes a processor, a transceiver, and a memory storing a computer program executable by the processor. The processor is configured to run the computer program to implement the method described in the embodiments of the first aspect.

BRIEF DESCRIPTION OF THE DRAWINGS

The above-mentioned and/or additional aspects and advantages of the present disclosure will be apparent and readily understood from the following description of embodiments taken in conjunction with the accompanying drawings.

DETAILED DESCRIPTION

Figure 1:
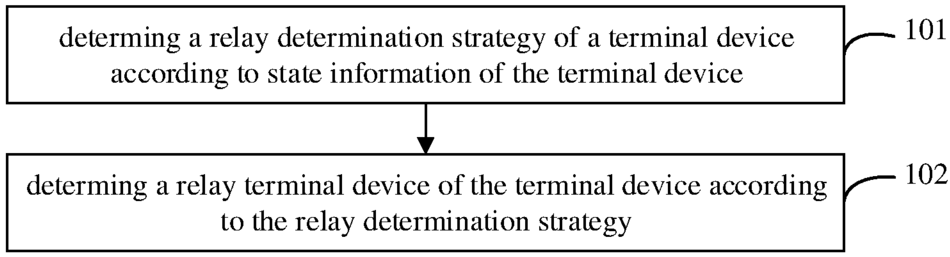
FIG. 1 is a flow chart of a relay determination method provided in an embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the present disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "in case that," and "if" may be construed to mean "when" or "upon" or "in response to determining" depending on the context.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure.

In the related art, when a link of a remote terminal device fails to connect or a remote terminal device receives a signaling display indication, it is necessary to reselect an appropriate relay terminal device to resume a connection with a network device. A communication link between the remote terminal device and the relay terminal device is referred to as a sidelink. In order to ensure service continuity when the remote terminal device moves in different cells, the remote terminal device selects the relay terminal device according to a serving cell to which the remote terminal device belongs. When the remote terminal device is in a disconnected state, the service continuity is not required. At this time, the relay terminal device is still selected according to the serving cell to which the remote terminal device belongs, so it is difficult to ensure a link quality between the remote terminal device and the network device, and communication performance is degraded.

FIG. 1 is a flow chart of a relay determination method provided in an embodiment of the present disclosure. It is to be noted that the relay determination method of the embodiment of the present disclosure is performed by a terminal device. The terminal device in the embodiment of the present application is an entity on a user side for receiving or transmitting signals, such as a mobile phone. The terminal device may also be referred to as a terminal, a user equipment (UE), a mobile station (MS), a mobile terminal (MT), and so on. The terminal device may be a car with a communication function, a smart car, a mobile phone, a wearable device, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart city, a wireless terminal device in a smart home, etc.

As shown in FIG. 1, the relay determination method includes steps as follows.

In step 101, a relay determination strategy of the terminal device is determined according to state information of the terminal device.

The state information of the terminal device refers to what state the terminal device is in. The state information may be any one of a connected state, an inactive state, an idle state, being in a radio resource control (RRC) reestablishment process or being in a RRC recovery process, etc. The terminal device sends and receives different RRC messages according to a protocol, and enters different states.

In a 5th generation mobile communication technology (5G) new radio (NR) system, an inactive state is introduced. In the inactive state, both a terminal device side and a network device side retain an access stratum (AS) context and security information. The terminal device may quickly enter a connected state through a RRC recovery process.

In some implementations, the relay determination strategy may be a strategy that the terminal device selects according to at least one of a serving cell to which the terminal device belongs, a radio access network (RAN) area in which a serving cell is located, a radio channel quality, and a public land mobile network (PLMN) identifier of a serving cell.

In step 102, a relay terminal device of the terminal device is determined according to the relay determination strategy.

According to a determined relay determination strategy, a terminal device that satisfies a condition is selected from the terminal device as the relay terminal device.

It is to be noted that, in some embodiments, the terminal device may perform the relay determination method shown in various embodiments at an access stratum (AS). In some embodiments, the terminal device may perform the relay determination method shown in various embodiments at a non-access stratum (NAS).

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, the relay determination strategy of the terminal device is determined according to the state information of the terminal device, and the relay terminal device of the terminal device is determined according to the determined relay determination strategy, so that the terminal device may select different relay determination strategies according to different states, and determine different relay terminal devices, thus improving qualities of communication links, and improving communication performance of the terminal device.

Figure 2:
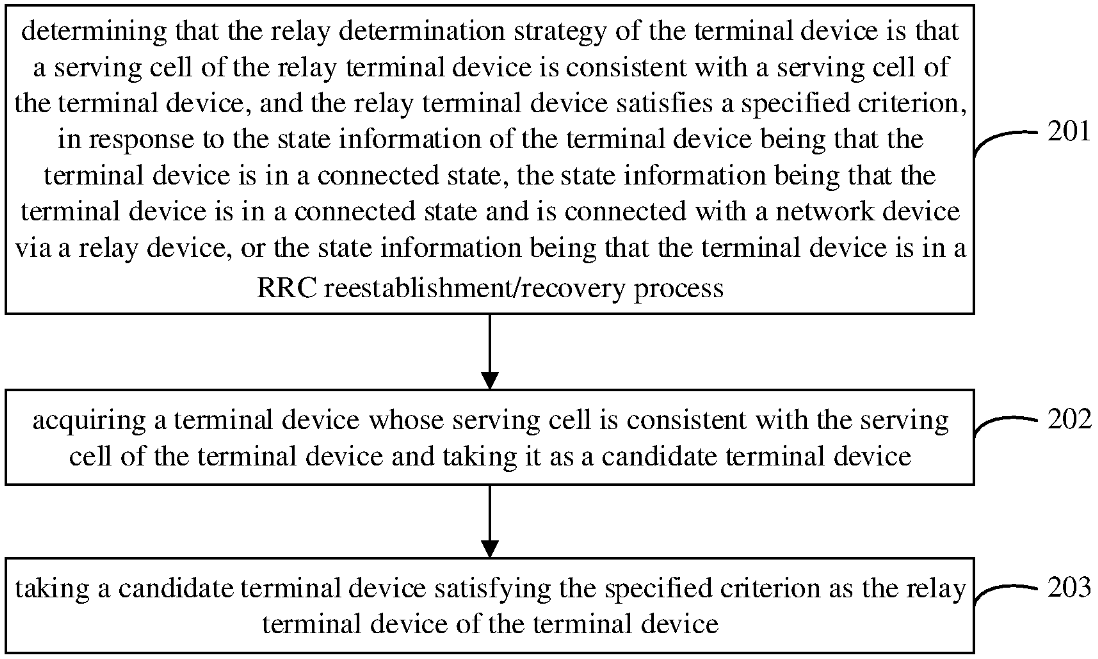
FIG. 2 is a flow chart of another relay determination method provided in an embodiment of the present disclosure.

FIG. 2 is a flow chart of another relay determination method provided in an embodiment of the present disclosure, which is performed by a terminal device.

As shown in FIG. 2, the relay determination method includes steps as follows.

In step 201, it is determined that the relay determination strategy of the terminal device is that a serving cell of the relay terminal device is consistent with a serving cell of the terminal device, and the relay terminal device satisfies a specified criterion, in response to the state information of the terminal device being that the terminal device is in a connected state, the state information being that the terminal device is in a connected state and is connected with a network device via a relay device, or the state information being that the terminal device is in a RRC reestablishment/recovery process.

In an implementation, the terminal device is in the connected state, and it is determined that the relay determination strategy of the terminal device is that the serving cell of the relay terminal device is consistent with the serving cell of the terminal device, and the relay terminal device satisfies the specified criterion.

In an implementation, the terminal device is in the connected state and is connected with the network device via the relay device, and it is determined that the relay determination strategy of the terminal device is that the serving cell of the relay terminal device is consistent with the serving cell of the terminal device, and the relay terminal device satisfies the specified criterion.

In an implementation, the terminal device is in the RRC reestablishment process, and it is determined that the relay determination strategy of the terminal device is that the serving cell of the relay terminal device is consistent with the serving cell of the terminal device, and the relay terminal device satisfies the specified criterion.

In an implementation, the terminal device is in the RRC recovery process, it is determined that the relay determination strategy of the terminal device is that the serving cell of the relay terminal device is consistent with the serving cell of the terminal device, and the relay terminal device satisfies the specified criterion.

Optionally, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

Optionally, the wireless channel quality between the relay terminal device and the terminal device includes a sidelink discovery reference signal receiving power (SD-RSRP), or a sidelink reference signal receiving power (SL-RSRP).

Optionally, different thresholds may be set according to different measurement types of the wireless channel quality of the sidelink, and different thresholds may also be set according to different requirements of the terminal device. According to different requirements of the channel quality, the preset threshold may be set to −95 dBm, −90 dBm or −85 dBm according to different requirements.

In step 202, a terminal device whose serving cell is consistent with the serving cell of the terminal device is acquired and taken it as a candidate terminal device.

Optionally, it is determined whether a serving cell of the terminal device and a serving cell of the candidate terminal device are consistent by acquiring an identifier of the serving cell of the terminal device and an identifier of the serving cell of the candidate terminal device.

In step 203, a candidate terminal device satisfying the specified criterion is taken as the relay terminal device of the terminal device.

In an implementation, in case that the specified criterion is that the wireless channel quality of the sidelink between the relay terminal device and the terminal device is higher than the preset threshold, a relay determination apparatus may calculate a wireless channel quality of a sidelink between the candidate terminal device and the terminal device, and take a candidate terminal device whose wireless channel quality is higher than the preset threshold as the relay terminal device.

Optionally, the candidate terminal devices are sorted according to calculated wireless channel qualities, and a candidate terminal device with a highest wireless channel quality is selected as the relay terminal device.

In an implementation, in case that the specified criterion is that the PLMN identifier of the serving cell of the relay terminal device is consistent with the PLMN identifier of the serving cell of the terminal device, the PLMN identifier of the serving cell of the terminal device and a PLMN identifier of the serving cell of the candidate terminal device are acquired, and a candidate terminal device whose PLMN identifier of the serving cell is consistent with the PLMN identifier of the serving cell of the terminal device is taken as the relay terminal device.

In an implementation, in case that the specified criterion is that the wireless channel quality of the sidelink between the relay terminal device and the terminal device is higher than the preset threshold, and the PLMN identifier of the serving cell of the relay terminal device is consistent with the PLMN identifier of the serving cell of the terminal device, a wireless channel quality of a sidelink between the candidate terminal device and the terminal device is calculated, the PLMN identifier of the serving cell of the terminal device and a PLMN identifier of the serving cell of the candidate terminal device are acquired, and a candidate terminal device whose wireless channel quality is high than the preset threshold and whose PLMN identifier of the serving cell is consistent with the PLMN identifier of the serving cell of the terminal device is taken as the relay terminal device.

It may be understood that the above-mentioned steps do not limit the order of implementation of the steps. In the embodiment of the present disclosure, a terminal device satisfying the specified criterion may also be acquired and taken it as a candidate terminal device, and the candidate terminal device whose serving cell is consistent with the serving cell of the terminal device may be taken as the relay terminal device.

It is to be noted that, in some embodiments, the terminal device may perform the relay determination method shown in the embodiment at the AS stratum. In some embodiments, the terminal device may perform the relay determination method shown in the embodiment at the NAS stratum.

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, in response to the state information of the terminal device being that the terminal device is in the connected state, the state information being that the terminal device is in the connected state and is connected with the network device via the relay device, or the state information being that the terminal device is in the RRC reestablishment/recovery process, it is determined that the relay determination strategy of the terminal device is that the serving cell of the relay terminal device is consistent with the serving cell of the terminal device, and the relay terminal device satisfies the specified criterion. The relay terminal device of the terminal device is determined according to a determined relay determination strategy, so that the terminal device may select a terminal device whose serving cell is consistent with the serving cell of the terminal device and whose channel quality is better as the relay terminal device, thus ensuring the continuity of services, improving qualities of communication links, and improving communication performance of the terminal device.

Figures 3, 4:
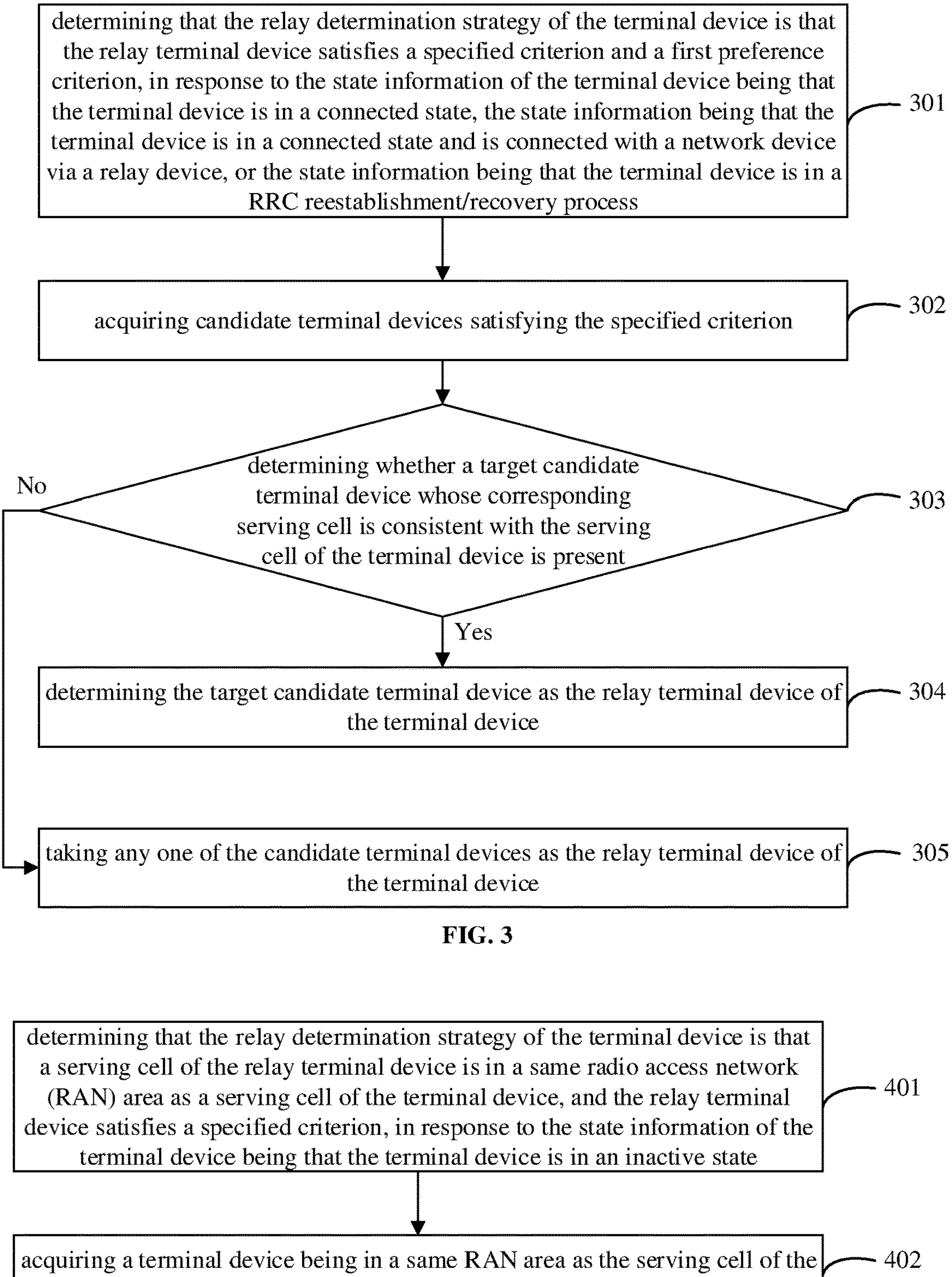
FIG. 3 is a flow chart of another relay determination method provided in an embodiment of the present disclosure.
FIG. 4 is a flow chart of another relay determination method provided in an embodiment of the present disclosure.

FIG. 3 is a flow chart of another relay determination method provided in an embodiment of the present disclosure, which is performed by a terminal device.

As shown in FIG. 3, the relay determination method includes steps as follows.

In step 301, it is determined that the relay determination strategy of the terminal device is that the relay terminal device satisfies a specified criterion and a first preference criterion, in response to the state information of the terminal device being that the terminal device is in a connected state, the state information being that the terminal device is in a connected state and is connected with a network device via a relay device, or the state information being that the terminal device is in a RRC reestablishment/recovery process.

The first preference criterion represents that a terminal device whose corresponding serving cell is consistent with a serving cell of the terminal device is preferentially selected as the relay terminal device.

In an implementation, the terminal device is in the connected state, and it is determined that the relay determination strategy of the terminal device is that the relay terminal device satisfies the specified criterion and the first preference criterion.

In an implementation, the terminal device is in the connected state and is connected with the network device via the relay device, and it is determined that the relay determination strategy of the terminal device is that the relay terminal device satisfies the specified criterion and the first preference criterion.

In an implementation, the terminal device is in the RRC reestablishment process, and it is determined that the relay determination strategy of the terminal device is that the relay terminal device satisfies the specified criterion and the first preference criterion.

In an implementation, the terminal device is in the RRC recovery process, and it is determined that the relay determination strategy of the terminal device is that the relay terminal device satisfies the specified criterion and the first preference criterion.

Optionally, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

Optionally, the wireless channel quality between the relay terminal device and the terminal device includes a sidelink discovery reference signal receiving power (SD-RSRP), or a sidelink reference signal receiving power (SL-RSRP).

Optionally, different thresholds may be set according to different measurement types of the wireless channel quality of the sidelink, and different thresholds may also be set according to different requirements of the terminal device. According to different requirements of the channel quality, the preset threshold may be set to −95 dBm, −90 dBm or −85 dBm according to different requirements.

In step 302, candidate terminal devices satisfying the specified criterion are acquired.

In an implementation, in case that the specified criterion is that the wireless channel quality of the sidelink between the relay terminal device and the terminal device is higher than the preset threshold, a wireless channel quality of a sidelink between a terminal device and the terminal device is calculated, and a terminal device whose wireless channel quality is higher than the preset threshold is taken as the candidate terminal device.

In an implementation, in case that the specified criterion is that the PLMN identifier of the serving cell of the relay terminal device is consistent with the PLMN identifier of the serving cell of the terminal device, a PLMN identifier of a serving cell of a terminal device and the PLMN identifier of the serving cell of the terminal device are acquired, and a terminal device whose PLMN identifier of the serving cell is consistent with the PLMN identifier of the serving cell of the terminal device is taken as the candidate terminal device.

In an implementation, in case that the specified criterion is that the specified criterion is that the wireless channel quality of the sidelink between the relay terminal device and the terminal device is higher than the preset threshold, and the PLMN identifier of the serving cell of the relay terminal device is consistent with the PLMN identifier of the serving cell of the terminal device, a wireless channel quality of a sidelink between a terminal device and the terminal device is calculated, a PLMN identifier of a serving cell of the terminal device and the PLMN identifier of the serving cell of the terminal device are acquired, and a terminal device whose wireless channel quality is high than the preset threshold and whose PLMN identifier of the serving cell is consistent with the PLMN identifier of the serving cell of the terminal device is taken as the candidate terminal device.

In step 303, it is determined whether a target candidate terminal device whose corresponding serving cell is consistent with the serving cell of the terminal device is present. If yes, step 304 is performed. If no, step 305 is performed.

Optionally, it is determined whether the serving cell of the terminal device and a serving cell of the candidate terminal device are consistent by acquiring an identifier of the serving cell of the terminal device and an identifier of the serving cell of the candidate terminal device.

In step 304, the target candidate terminal device is determined as the relay terminal device of the terminal device.

In step 305, any one of the candidate terminal devices determined in step 302 is taken as the relay terminal device of the terminal device.

It is to be noted that, in some embodiments, the terminal device may perform the relay determination method shown in the embodiment at the AS stratum. In some embodiments, the terminal device may perform the relay determination method shown in the embodiment at the NAS stratum.

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, in response to the state information of the terminal device being that the terminal device is in the connected state, the state information being that the terminal device is in the connected state and is connected with the network device via the relay device, or the state information being that the terminal device is in the RRC reestablishment/recovery process, it is determined that the relay determination strategy of the terminal device is that the relay terminal device satisfies the specified criterion and the first preference criterion. The candidate terminal devices satisfying the specified criterion are acquired. It is determined whether the target candidate terminal device whose corresponding serving cell is consistent with the serving cell of the terminal device is present. If yes, the target candidate terminal device is determined as the relay terminal device of the terminal device. If no, any one of the candidate terminal devices is taken as the relay terminal device of the terminal device, so that the terminal device may preferentially select a terminal device whose serving cell is consistent with the serving cell of the terminal device as the relay terminal device from the terminal devices with better channel qualities, thus ensuring the continuity of services, improving flexibility of relay determination, improving qualities of communication links, and improving communication performance of the terminal device.

FIG. 4 is a flow chart of another relay determination method provided in an embodiment of the present disclosure, which is performed by a terminal device.

As shown in FIG. 4, the relay determination method includes steps as follows.

In step 401, it is determined that the relay determination strategy of the terminal device is that a serving cell of the relay terminal device is in a same radio access network (RAN) area as a serving cell of the terminal device, and the relay terminal device satisfies a specified criterion, in response to the state information of the terminal device being that the terminal device is in an inactive state.

Optionally, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

Optionally, the wireless channel quality between the relay terminal device and the terminal device includes a sidelink discovery reference signal receiving power (SD-RSRP), or a sidelink reference signal receiving power (SL-RSRP).

Optionally, different thresholds may be set according to different measurement types of the wireless channel quality of the sidelink, and different thresholds may also be set according to different requirements of the terminal device. According to different requirements of the channel quality, the preset threshold may be set to −95 dBm, −90 dBm or −85 dBm according to different requirements.

In step 402, a terminal device being in a same RAN area as the serving cell of the terminal device is acquired and taken it as a candidate terminal device.

Optionally, a RAN area of a serving cell is determined by acquiring a cell list carried in a RRC release message.

In step 403, candidate terminal devices satisfying the specified criterion are taken as the relay terminal device of the terminal device.

In an implementation, in case that the specified criterion is that the wireless channel quality of the sidelink between the relay terminal device and the terminal device is higher than the preset threshold, a wireless channel quality of a sidelink between the candidate terminal device and the terminal device is calculated, and the candidate terminal device whose wireless channel quality is higher than the preset threshold is taken as the relay terminal device.

Optionally, the candidate terminal devices are sorted according to calculated wireless channel qualities, and a candidate terminal device with a highest wireless channel quality is selected as the relay terminal device.

In an implementation, in case that the specified criterion is that the PLMN identifier of the serving cell of the relay terminal device is consistent with the PLMN identifier of the serving cell of the terminal device, the PLMN identifier of the serving cell of the terminal device and a PLMN identifier of a serving cell of the candidate terminal device are acquired, and a candidate terminal device whose PLMN identifier of the serving cell is consistent with the PLMN identifier of the serving cell of the terminal device is taken as the relay terminal device.

In an implementation, in case that the specified criterion is that the wireless channel quality of the sidelink between the relay terminal device and the terminal device is higher than the preset threshold, and the PLMN identifier of the serving cell of the relay terminal device is consistent with the PLMN identifier of the serving cell of the terminal device, a wireless channel quality of a sidelink between the candidate terminal device and the terminal device is calculated, the PLMN identifier of the serving cell of the terminal device and a PLMN identifier of the serving cell of the candidate terminal device are acquired, and a candidate terminal device whose wireless channel quality is high than the preset threshold and whose PLMN identifier of the serving cell is consistent with the PLMN identifier of the serving cell of the terminal device is taken as the relay terminal device.

It may be understood that the above-mentioned steps do not limit the order of implementation of the steps. In the embodiment of the present disclosure, a terminal device satisfying the specified criterion may also be acquired and taken it as a candidate terminal device, and the candidate terminal device whose serving cell is consistent with the serving cell of the terminal device may be taken as the relay terminal device.

It is to be noted that, in some embodiments, the terminal device may perform the relay determination method shown in the embodiment at the AS stratum. In some embodiments, the terminal device may perform the relay determination method shown in the embodiment at the NAS stratum.

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, in response to the state information of the terminal device being that the terminal device is in the inactive state, it is determined that the relay determination strategy of the terminal device is that the serving cell of the relay terminal device is in the same radio access network (RAN) area as the serving cell of the terminal device, and the relay terminal device satisfies the specified criterion. The relay terminal device of the terminal device is determined according to a determined relay determination strategy, so that the terminal device may select a terminal device whose serving cell is in the same RAN area as the serving cell of the terminal device and whose channel quality is better as the relay terminal device. The terminal device in the inactive state does not need to report when moving between cells in the RAN area, which not only ensures the continuity of services, but also improves qualities of communication links, and improves communication performance of the terminal device.

Figure 5:
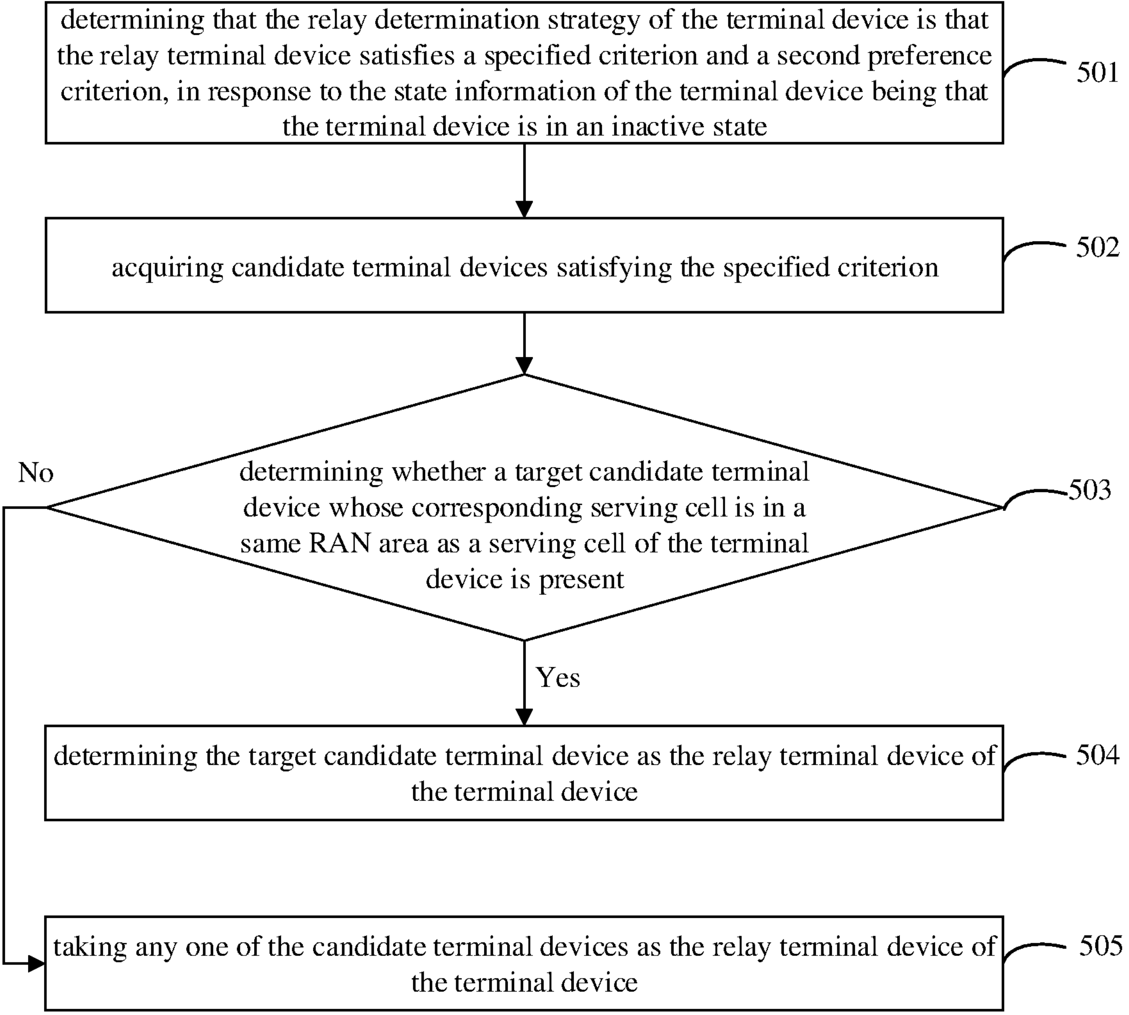
FIG. 5 is a flow chart of another relay determination method provided in an embodiment of the present disclosure.

FIG. 5 is a flow chart of another relay determination method provided in an embodiment of the present disclosure, which is performed by a terminal device.

As shown in FIG. 5, the relay determination method includes steps as follows.

In step 501, it is determined that the relay determination strategy of the terminal device is that the relay terminal device satisfies a specified criterion and a second preference criterion, in response to the state information of the terminal device being that the terminal device is in an inactive state.

The second preference criterion represents that a terminal device whose corresponding serving cell is in a same RAN area as a serving cell of the terminal device is preferentially selected as the relay terminal device.

Optionally, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

Optionally, the wireless channel quality between the relay terminal device and the terminal device includes a sidelink discovery reference signal receiving power (SD-RSRP), or a sidelink reference signal receiving power (SL-RSRP).

Optionally, different thresholds may be set according to different measurement types of the wireless channel quality of the sidelink, and different thresholds may also be set according to different requirements of the terminal device. According to different requirements of the channel quality, the preset threshold may be set to −95 dBm, −90 dBm or −85 dBm according to different requirements.

In step 502, candidate terminal devices satisfying the specified criterion are acquired.

In an implementation, in case that the specified criterion is that the wireless channel quality of the sidelink between the relay terminal device and the terminal device is higher than the preset threshold, a wireless channel quality of a sidelink between a terminal device and the terminal device is calculated, and a terminal device whose wireless channel quality is higher than the preset threshold is taken as the candidate terminal device.

In an implementation, in case that the specified criterion is that the PLMN identifier of the serving cell of the relay terminal device is consistent with the PLMN identifier of the serving cell of the terminal device, a PLMN identifier of a serving cell of a terminal device and the PLMN identifier of the serving cell of the terminal device are acquired, and a terminal device whose PLMN identifier of the serving cell is consistent with the PLMN identifier of the serving cell of the terminal device is taken as the candidate terminal device.

In an implementation, in case that the specified criterion is that the specified criterion is that the wireless channel quality of the sidelink between the relay terminal device and the terminal device is higher than the preset threshold, and the PLMN identifier of the serving cell of the relay terminal device is consistent with the PLMN identifier of the serving cell of the terminal device, a wireless channel quality of a sidelink between a terminal device and the terminal device is calculated, a PLMN identifier of a serving cell of the terminal device and the PLMN identifier of the serving cell of the terminal device are acquired, and a terminal device whose wireless channel quality is high than the preset threshold and whose PLMN identifier of the serving cell is consistent with the PLMN identifier of the serving cell of the terminal device is taken as the candidate terminal device.

In step 503, it is determined whether a target candidate terminal device whose corresponding serving cell is in a same RAN area as a serving cell of the terminal device is present. If yes, step 504 is performed. If no, step 505 is performed.

Optionally, a RAN area of a serving cell is determined by acquiring a cell list carried in a RRC release message.

Optionally, it is determined whether the serving cell of the terminal device and a serving cell of the candidate terminal device are in a same RAN area via identifiers of serving cells.

In step 504, the target candidate terminal device is determined as the relay terminal device of the terminal device.

In step 505, any one of the candidate terminal devices determined in step 502 is taken as the relay terminal device of the terminal device.

It is to be noted that, in some embodiments, the terminal device may perform the relay determination method shown in the embodiment at the AS stratum. In some embodiments, the terminal device may perform the relay determination method shown in the embodiment at the NAS stratum.

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, in response to the state information of the terminal device being that the terminal device is in the inactive state, it is determined that the relay determination strategy of the terminal device is that the relay terminal device satisfies the specified criterion and the second preference criterion. The candidate terminal devices satisfying the specified criterion are acquired. It is determined whether the target candidate terminal device whose corresponding serving cell is in the same RAN area as the serving cell of the terminal device is present. If yes, the target candidate terminal device is determined as the relay terminal device of the terminal device. If no, any one of the candidate terminal devices is determined as the relay terminal device of the terminal device, so that the terminal device in the inactive state may preferentially select a terminal device whose serving cell is in the same RAN area as the serving cell of the terminal device as the relay terminal device from the terminal devices with better channel qualities, thus ensuring continuity of services, improving flexibility of determining relay, improving qualities of communication links, and improving communication performance of the terminal device.

Figure 6:
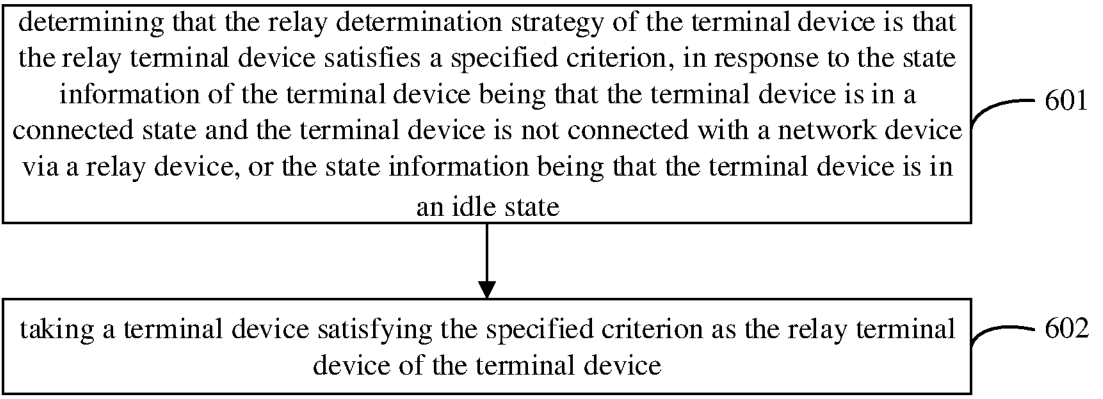
FIG. 6 is a flow chart of another relay determination method provided in an embodiment of the present disclosure.

FIG. 6 is a flow chart of another relay determination method provided in an embodiment of the present disclosure, which is performed by a terminal device.

As shown in FIG. 6, the relay determination method includes steps as follows.

In step 601, it is determined that the relay determination strategy of the terminal device is that the relay terminal device satisfies a specified criterion, in response to the state information of the terminal device being that the terminal device is in a connected state and the terminal device is not connected with a network device via a relay device, or the state information being that the terminal device is in an idle state.

In an implementation, the terminal device is in the connected state and is not connected with the network device via the relay device, and it is determined that the relay determination strategy of the terminal device is that the serving cell of the relay terminal device is consistent with the serving cell of the terminal device, and the relay terminal device satisfies the specified criterion.

In an implementation, the terminal device is in the idle state, and it is determined that the relay determination strategy of the terminal device is that the relay terminal device satisfies the specified criterion.

Optionally, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

Optionally, the wireless channel quality between the relay terminal device and the terminal device includes a sidelink discovery reference signal receiving power (SD-RSRP), or a sidelink reference signal receiving power (SL-RSRP).

Optionally, different thresholds may be set according to different measurement types of the wireless channel quality of the sidelink, and different thresholds may also be set according to different requirements of the terminal device. According to different requirements of the channel quality, the preset threshold may be set to −95 dBm, −90 dBm or −85 dBm according to different requirements.

In step 602, a terminal device satisfying the specified criterion is taken as the relay terminal device of the terminal device.

In an implementation, in case that the specified criterion is that the wireless channel quality of the sidelink between the relay terminal device and the terminal device is higher than the preset threshold, a wireless channel quality of a sidelink between the terminal device and the terminal device is calculated, and a terminal device whose wireless channel quality is higher than the preset threshold is taken as the relay terminal device.

Optionally, the terminal devices are sorted according to calculated wireless channel qualities, and a terminal device with a highest wireless channel quality is selected as the relay terminal device.

In an implementation, in case that the specified criterion is that the PLMN identifier of the serving cell of the relay terminal device is consistent with the PLMN identifier of the serving cell of the terminal device, a PLMN identifier of a serving cell of the terminal device and the PLMN identifier of the serving cell of the terminal device are acquired, and a terminal device whose PLMN identifier of the serving cell is consistent with the PLMN identifier of the serving cell of the terminal device is taken as the relay terminal device.

In an implementation, in case that the specified criterion is that the wireless channel quality of the sidelink between the relay terminal device and the terminal device is higher than the preset threshold, and the PLMN identifier of the serving cell of the relay terminal device is consistent with the PLMN identifier of the serving cell of the terminal device, a wireless channel quality of a sidelink between the terminal device and the terminal device is calculated, a PLMN identifier of a serving cell of the terminal device and the PLMN identifier of the serving cell of the terminal device are acquired, and a terminal device whose wireless channel quality is high than the preset threshold and whose PLMN identifier of the serving cell is consistent with the PLMN identifier of the serving cell of the terminal device is taken as the relay terminal device.

It is to be noted that, in some embodiments, the terminal device may perform the relay determination method shown in the embodiment at the AS stratum. In some embodiments, the terminal device may perform the relay determination method shown in the embodiment at the NAS stratum.

In addition, it is to be noted that, when the relay determination method is performed at the NAS stratum, the terminal device performs the method according to information transferred by the AS stratum. Transferred information may include at least one of state information of the terminal device, a serving cell of each terminal device, and a list of serving cells of each terminal device.

In the embodiment of the present disclosure, in response to the state information of the terminal device being that the terminal device is in the connected state and the terminal device is not connected with the network device via the relay device, or the state information being that the terminal device is in the idle state, it is determined that the relay determination strategy of the terminal device is that the relay terminal device satisfies the specified criterion. The terminal device satisfying the specified criterion is taken as the relay terminal device of the terminal device, so that the terminal device may relieve the restriction of the consistency of serving cells, and select a terminal device with a better wireless channel quality as the relay terminal device, thus improving flexibility of determining relay, improving qualities of communication links, and improving communication performance of the terminal device.

Figure 7:
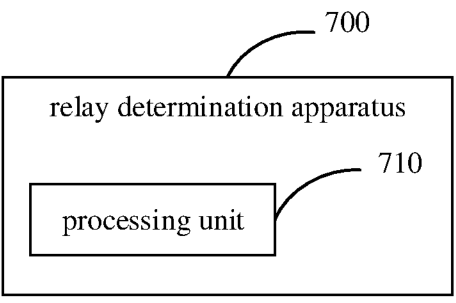
FIG. 7 is a schematic diagram of a relay determination apparatus provided in the present disclosure.

Corresponding to data transmission methods provided in the above-mentioned embodiments, the present disclosure also provides a relay determination apparatus. Since the relay determination apparatus provided in the embodiment of the present disclosure corresponds to the methods provided in the above-mentioned embodiments, the implementation of the relay determination method is also applicable to the relay determination apparatus provided in the embodiment of the present disclosure, which will not be described in detail in the embodiment of the present disclosure. FIG. 7 is a schematic diagram of a relay determination apparatus according to the present disclosure.

FIG. 7 is a schematic diagram of a relay determination apparatus provided in an embodiment of the present disclosure, which is applied to a terminal device.

As shown in FIG. 7, a relay determination apparatus 700 includes a processing unit 710. The processing unit 710 is configured to determine a relay determination strategy of the terminal device according to state information of the terminal device. The processing unit 710 is further configured to determine a relay terminal device of the terminal device according to the relay determination strategy.

In an implementation of the embodiment of the present disclosure, the processing unit 710 is specifically configured to determine that the relay determination strategy is that a serving cell of the relay terminal device is consistent with a serving cell of the terminal device, and the relay terminal device satisfies a specified criterion, in response to the state information being that the terminal device is in a connected state, or determine that the relay determination strategy is that the relay terminal device satisfies a specified criterion and a first preference criterion, in response to the state information being that the terminal device is in a connected state. The first preference criterion represents that a terminal device whose corresponding serving cell is consistent with a serving cell of the terminal device is preferentially selected as the relay terminal device.

In an implementation of the embodiment of the present disclosure, the processing unit 710 is specifically configured to determine that the relay determination strategy is that a serving cell of the relay terminal device is consistent with a serving cell of the terminal device, and the relay terminal device satisfies a specified criterion, in response to the state information being that the terminal device is in a connected state and the terminal device is connected with a network device via a relay device, or determine that the relay determination strategy is that the relay terminal device satisfies a specified criterion and a first preference criterion, in response to the state information being that the terminal device is in a connected state and the terminal device is a remote terminal device. The first preference criterion represents that a terminal device whose corresponding serving cell is consistent with a serving cell of the terminal device is preferentially selected as the relay terminal device.

In an implementation of the embodiment of the present disclosure, the processing unit 710 is specifically configured to determine that the relay determination strategy is that the relay terminal device satisfies a specified criterion, in response to the state information being that the terminal device in a connected state and the terminal device is not connected with a network device via a relay device.

In an implementation of the embodiment of the present disclosure, the processing unit 710 is specifically configured to determine that the relay determination strategy is that a serving cell of the relay terminal device is in a same radio access network (RAN) area as a serving cell of the terminal device, and the relay terminal device satisfies a specified criterion, in response to the state information being that the terminal device is in an inactive state, or determine that the relay determination strategy is that the relay terminal device satisfies a specified criterion and a second preference criterion, in response to the state information being that the terminal device is in an inactive state. The second preference criterion represents that a terminal device whose corresponding serving cell is in a same RAN area as a serving cell of the terminal device is preferentially selected as the relay terminal device.

In an implementation of the embodiment of the present disclosure, the processing unit 710 is specifically configured to determine that the relay determination strategy is that the relay terminal device satisfies a specified criterion, in response to the state information being that the terminal device is in an idle state.

In an implementation of the embodiment of the present disclosure, the processing unit 710 is specifically configured to determine that the relay determination strategy is that a serving cell of the relay terminal device is consistent with a serving cell of the terminal device, and the relay terminal device satisfies a specified criterion, in response to the state information being that the terminal device is in a radio resource control (RRC) reestablishment process or a RRC recovery process, or determine that the relay determination strategy is that the relay terminal device satisfies a specified criterion and a first preference criterion, in response to the state information being that the terminal device is in a RRC reestablishment process or a RRC recovery process. The first preference criterion represents that a terminal device whose corresponding serving cell is consistent with a serving cell of the terminal device is preferentially selected as the relay terminal device.

In an implementation of the embodiment of the present disclosure, the processing unit 710 is specifically configured to acquire candidate terminal devices satisfying the specified criterion, and determine a target candidate terminal device as the relay terminal device of the terminal device, in response to the target candidate terminal device whose corresponding serving cell is consistent with the serving cell of the terminal device being present in the candidate terminal devices, or take any one of the candidate terminal devices as the relay terminal device of the terminal device, in response to no target candidate terminal device whose corresponding serving cell is consistent with the serving cell of the terminal device being present in the candidate terminal devices.

In an implementation of the embodiment of the present disclosure, the processing unit 710 is specifically configured to acquire candidate terminal devices satisfying the specified criterion, and determine a target candidate terminal device as the relay terminal device of the terminal device, in response to the target candidate terminal device whose corresponding serving cell is in the same RAN area as the serving cell of the terminal device being present in the candidate terminal devices, or take any one of the candidate terminal devices as the relay terminal device of the terminal device, in response to no target candidate terminal device whose corresponding serving cell is in the same RAN area as the serving cell of the terminal device being present in the candidate terminal devices.

In an implementation of the embodiment of the present disclosure, the specified criterion includes at least one of a wireless channel quality of a sidelink between the relay terminal device and the terminal device being higher than a preset threshold, a public land mobile network (PLMN) identifier of the serving cell of the relay terminal device being consistent with a PLMN identifier of the serving cell of the terminal device.

In an implementation of the embodiment of the present disclosure, the processing unit 710 performs a determination process of the relay terminal device at an access stratum, or the processing unit performs a determination process of the relay terminal device at a non-access stratum according to transfer information of an access stratum. The transfer information includes at least one of the state information, a serving cell of each terminal device, and a list of serving cells of each terminal device.

In the embodiment of the present disclosure, the relay determination apparatus may determine the relay determination strategy of the terminal device according to the state information of the terminal device, and determine the relay terminal device of the terminal device according to determined relay determination strategy, so that the terminal device may select different relay determination strategies according to different states, and determine different relay terminal devices, thus improving qualities of communication links, and improving communication performance of the terminal device.

In order to realize the above-mentioned embodiments, an embodiment of the present disclosure also provides another relay determination device. The relay determination device includes a processor, and an interface circuit configured to receive code instructions and transmit the code instructions to the processor. The processor is configured to run the code instructions to perform the methods shown in the embodiments of FIGS. 1 to 6.

In order to realize the above-mentioned embodiments, an embodiment of the present disclosure also provides a computer-readable storage medium. The computer-readable storage medium has stored therein instructions that, when executed, cause the method shown in the embodiments of FIGS. 1 to 6 to be implemented.

In order to realize the above-mentioned embodiments, the present disclosure also provides a computer program product that, when run on a computer, causes the computer to perform the methods shown in the embodiments of FIGS. 1 to 6 of the present disclosure.

In the relay determination method and the relay determination apparatus provided in the embodiment of the disclosure, the relay determination strategy of the terminal device is determined according to the state information of the terminal device, and the relay terminal device of the terminal device is determined according to a determined relay determination strategy, so that the terminal device may select different relay determination strategies according to different states, and determine different relay terminal devices, thus improving qualities of communication links, and improving communication performance of the terminal device.

Figure 8:
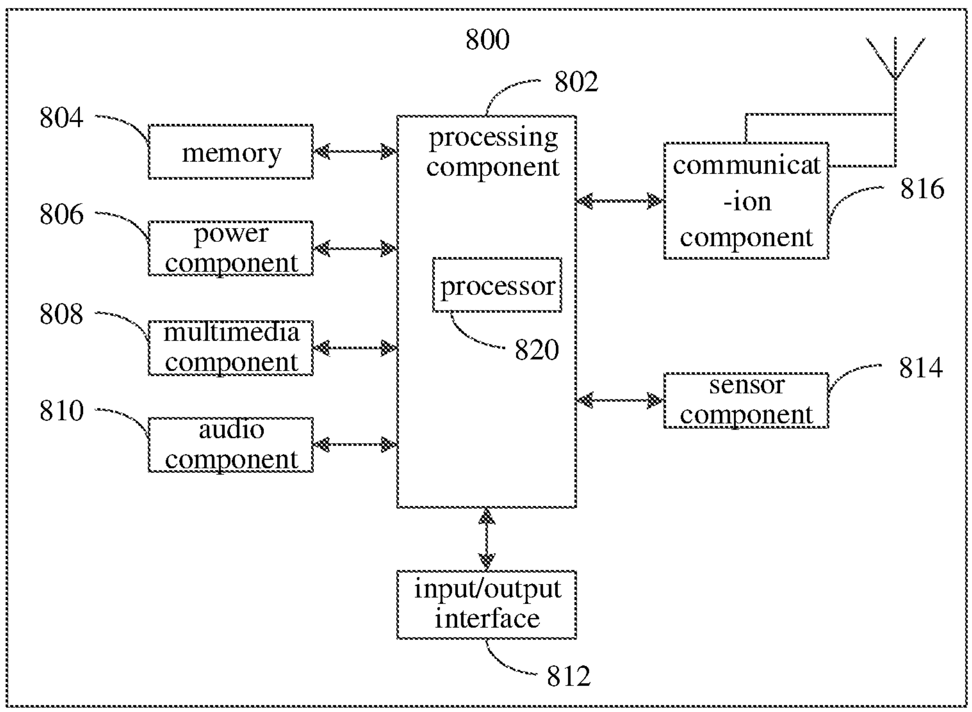
FIG. 8 is a schematic diagram of a communication device provided in the present disclosure.

FIG. 8 is a block diagram of a communication device 800 provided in an embodiment of the present disclosure. For example, the communication device 800 may be a mobile phone, a computer, a digital broadcast user equipment, a messaging device, a game console, a tablet device, a medical device, a fitness device, a personal digital assistant, or the like.

Referring to FIG. 8, the communication device 800 may include at least one of a processing component 802, a memory 804, a power component 806, a multimedia component 808, an audio component 810, an input/output (I/O) interface 812, a sensor component 814, and a communication component 816.

The processing component 802 typically controls overall operations of the communication device 800, such as the operations associated with display, phone calls, data communications, camera operations, and recording operations. The processing component 802 may include at least one processor 820 to execute instructions to perform all or some of the steps in the above-described methods. Moreover, the processing component 802 may include at least one module which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the communication device 800. Examples of such data include instructions for any applications or methods operated on the communication device 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the communication device 800. The power component 806 may include a power management system, at least one power source, and any other components associated with the generation, management, and distribution of power in the communication device 800.

The multimedia component 808 includes a screen providing an output interface between the communication device 800 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake up time and a pressure associated with the touch or swipe action. In some embodiments, the multimedia component 808 includes a front camera and/or a rear camera. The front camera and/or the rear camera may receive an external multimedia datum while the communication device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the communication device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes at least one sensor to provide status assessments of various aspects of the communication device 800. For instance, the sensor component 814 may detect an open/closed status of the communication device 800, relative positioning of components, e.g., the display and the keypad, of the communication device 800, a change in position of the communication device 800 or a component of the communication device 800, a presence or absence of user contact with the communication device 800, an orientation or an acceleration/deceleration of the communication device 800, and a change in temperature of the communication device 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wireless, between the communication device 800 and other devices. The communication device 800 may access a wireless network based on a communication standard, such as WiFi, 2G, or 3G, or a combination thereof. In an illustrative embodiment, the communication component 816 receives a broadcast signal or broadcast associated information from an external broadcast management system via a broadcast channel. In an illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the communication device 800 may be implemented with at least one application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic elements, for performing the method in any one of the above-mentioned embodiments.

In an illustrative embodiment, there is also provided a non-transitory computer readable storage medium including instructions, such as included in the memory 804, executable by the processor 820 in the communication device 800, for completing the above-mentioned methods. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

In order to realize the above-mentioned embodiment, an embodiment of the present disclosure also provides a communication device. The communication device may be a network device, may be a terminal device, may be a chip, a chip system, or a processor that supports the network device to implement the above-mentioned method, and may also be a chip, a chip system, or a processor that supports the terminal device to implement the above-mentioned method. The device may be configured to implement the method described in any one of the above-mentioned method embodiments. For details, reference may be made to the description in the above-mentioned method embodiment.

The communication device may include one or more processors. The processor may be a generic processor, a specific processor, or the like. For example, the processor may be a baseband processor or a central processor. The baseband processor may be configured to process a communication protocol and communication data, and the central processor may be configured to control a communication device (such as, a base station, a baseband chip, a terminal, a terminal chip, a DU, or a CU, etc.), execute computer programs, and process data of the computer programs.

Optionally, the communication device may further include one or more memories, on which a computer program may be stored, and the processor executes the computer program, so that the communication device may execute the method described in the above-mentioned method embodiments. Optionally, data may also be stored in the memory. The communication device and the memory may be set separately or integrated together.

Optionally, the communication device may further include a transceiver and an antenna. The transceiver may be referred to as a transceiver unit, a transceiver machine, or a transceiver circuit, etc., and is configured to realize a transceiver function. The transceiver may include a receiver and a transmitter. The receiver may be referred to as a receiver machine or a receiving circuit, etc., for realizing a receiving function. The transmitter may be referred to as a transmitting machine or a transmitting circuit, etc., and is configured to realize a transmitting function.

Optionally, the communication device may further include one or more interface circuits. The interface circuit is configured to receive code instructions and transmit the code instructions to the processor. The processor executes the code instructions to enable the communication device to perform the method described in any one of the above-mentioned method embodiments.

In an implementation, the processor may include a transceiver configured to receive and transmit functions. For example, the transceiver may be a transceiver circuit, an interface, or an interface circuit. The transceiver circuit, the interface, or the interface circuit configured to receive and transmit the functions may be separated or integrated together. The transceiver circuit, the interface, or the interface circuit may be configured to read and write codes/data, or the transceiver circuit, the interface, or the interface circuit may be configured for signal transmission or transfer.

In an implementation, the processor may store a computer program, and the computer program runs on the processor, which may cause the communication device to perform the method described in any one of the above-mentioned method embodiments. The computer program may be solidified in the processor, and in this case, the processor may be implemented by hardware.

In an implementation, the communication device may include a circuit, and the circuit may realize a function of transmitting, receiving or communicating in the above-mentioned method embodiments. The processor and transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, and the like. The processor and the transceiver may also be manufactured by using various IC process technologies, such as complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above-mentioned embodiment may be the network device or the terminal device, but the scope of the communication apparatus described in the present disclosure is not limited thereto. The communication apparatus may be a stand-alone device or may be part of a larger device. For example, the communication apparatus may be (1) a stand-alone integrated circuit (IC), a chip, or a chip system or a subsystem, (2) a set of one or more ICs, additionally, the set of the IC may also include storage components for storing data and computer programs, (3) an ASIC, such as a modem, (4) a module that may be embedded in other devices, (5) a receiver, a terminal, an intelligent terminal, a cellular phone, a wireless device, a handset, a mobile unit, a vehicle-mounted device, a network device, a cloud equipment, an artificial intelligence device, etc., (6) other devices, and so on.

In the case that the communication device may be a chip or a chip system, the chip may include a processor and an interface. The number of processors may be one or more, and the number of interfaces may be multiple.

Optionally, the chip also includes a memory for storing necessary computer programs and data.

Those skilled in the art may also understand that various illustrative logical blocks and steps listed in the embodiments of the present disclosure may be implemented by an electronic hardware, a computer software, or a combination thereof. Whether this function is realized by a hardware or a software depends on a specific application and design requirements of the whole system. Those skilled in the art may use various methods to realize the described functions for each specific application, but this realization should not be understood as beyond the scope of protection of the embodiments of the present disclosure.

Other embodiments of the disclosure will be apparent to those skilled in the art from consideration of the specification and practice of the disclosure disclosed here. The present disclosure is intended to cover any variations, uses, or adaptations of this disclosure that follow the general principles of this disclosure and include common general knowledge or conventional techniques in the art not disclosed by this disclosure. The description and examples are to be regarded as being exemplary only, with a true scope and spirit of the disclosure being indicated by the following claims.

It should be understood that the steps may be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above-mentioned embodiments are not intended to limit the extent of protection of the present disclosure. Those skilled in the art should understand that various modifications, combinations, sub-combinations, and replacements may be made according to design requirements and other factors. Any modifications, equivalent substitutions and improvements made within the spirit and principle of the present disclosure should be included in the extent of protection of the present disclosure.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A relay determination method, performed by a terminal device, comprising:

determining a relay determination strategy of the terminal device according to state information of the terminal device; and determining a relay terminal device of the terminal device according to the relay determination strategy;

wherein determining the relay determination strategy of the terminal device according to the state information of the terminal device comprises:

determining that the relay determination strategy is that the relay terminal device satisfies a specified criterion in a case where the state information indicates that the terminal device is in an idle state;

wherein the specified criterion comprises at least one of:

a wireless channel quality of a sidelink between the relay terminal device and the terminal device being higher than a preset threshold; or a public land mobile network (PLMN) identifier of a serving cell of the relay terminal device being consistent with a PLMN identifier of a serving cell of the terminal device.

2. The method of claim 1, wherein the method is performed by the terminal device at an access stratum; or the method is performed by the terminal device at a non-access stratum according to transfer information of an access stratum; wherein the transfer information comprises at least one of: the state information, a serving cell of each terminal device, or a list of serving cells of each terminal device.

3. The relay determination method according to claim 1, wherein the specified criterion is that the wireless channel quality of the sidelink between the relay terminal device and the terminal device is higher than the preset threshold, and the method further comprises:

calculating a wireless channel quality of a sidelink between a candidate terminal device and the terminal device; and determining a candidate terminal device whose wireless channel quality is higher than the preset threshold as the relay terminal device.

4. The relay determination method according to claim 1, wherein the specified criterion is that the PLMN identifier of the serving cell of the relay terminal device is consistent with the PLMN identifier of the serving cell of the terminal device, and the method further comprises:

acquiring the PLMN identifier of the serving cell of the terminal device and a PLMN identifier of a serving cell of a candidate terminal device, and determining a candidate terminal device whose PLMN identifier of the serving cell is consistent with the PLMN identifier of the serving cell of the terminal device as the relay terminal device.

5. The relay determination method according to claim 1, wherein the specified criterion is that the wireless channel quality of the sidelink between the relay terminal device and the terminal device is higher than the preset threshold and the PLMN identifier of the serving cell of the relay terminal device is consistent with the PLMN identifier of the serving cell of the terminal device, and the method further comprises:

calculating a wireless channel quality of a sidelink between a candidate terminal device and the terminal device;

acquiring the PLMN identifier of the serving cell of the terminal device and a PLMN identifier of a serving cell of the candidate terminal device, and determining a candidate terminal device whose wireless channel quality is higher than the preset threshold and whose PLMN identifier of the serving cell is consistent with the PLMN identifier of the serving cell of the terminal device as the relay terminal device.

6. A communication system, comprising: a terminal device configured to perform the relay determination method according to claim 1; and a network device.

7. A relay determination device, comprising:

a processor; and an interface circuit configured to receive code instructions and transmit the code instructions to the processor;

wherein the processor is configured to:

determine a relay determination strategy of a terminal device according to state information of the terminal device; and determine a relay terminal device of the terminal device according to the relay determination strategy;

wherein the processor is further configured to:

determine that the relay determination strategy is that the relay terminal device satisfies a specified criterion in a case where the state information indicates that the terminal device is in an idle state;

wherein the specified criterion comprises at least one of:

a wireless channel quality of a sidelink between the relay terminal device and the terminal device being higher than a preset threshold; or a public land mobile network (PLMN) identifier of a serving cell of the relay terminal device being consistent with a PLMN identifier of a serving cell of the terminal device.

8. The relay determination device of claim 7, wherein the processor is further configured to:

perform a determination process of the relay terminal device at an access stratum; or perform a determination process of the relay terminal device at a non-access stratum according to transfer information of an access stratum; wherein the transfer information comprises at least one of: the state information, a serving cell of each terminal device, or a list of serving cells of each terminal device.

9. The relay determination device of claim 7, wherein the specified criterion is that the wireless channel quality of the sidelink between the relay terminal device and the terminal device is higher than the preset threshold, and the processor is further configured to:

calculate a wireless channel quality of a sidelink between a candidate terminal device and the terminal device; and determine a candidate terminal device whose wireless channel quality is higher than the preset threshold as the relay terminal device.

10. The relay determination device of claim 7, wherein the specified criterion is that the PLMN identifier of the serving cell of the relay terminal device is consistent with the PLMN identifier of the serving cell of the terminal device, and the processor is further configured to:

acquire the PLMN identifier of the serving cell of the terminal device and a PLMN identifier of a serving cell of a candidate terminal device, and determine a candidate terminal device whose PLMN identifier of the serving cell is consistent with the PLMN identifier of the serving cell of the terminal device as the relay terminal device.

11. The relay determination device of claim 7, wherein the specified criterion is that the wireless channel quality of the sidelink between the relay terminal device and the terminal device is higher than the preset threshold and the PLMN identifier of the serving cell of the relay terminal device is consistent with the PLMN identifier of the serving cell of the terminal device, and the processor is further configured to:

calculate a wireless channel quality of a sidelink between a candidate terminal device and the terminal device;

acquire the PLMN identifier of the serving cell of the terminal device and a PLMN identifier of a serving cell of the candidate terminal device, and determine a candidate terminal device whose wireless channel quality is higher than the preset threshold and whose PLMN identifier of the serving cell is consistent with the PLMN identifier of the serving cell of the terminal device as the relay terminal device.

12. A communication device, comprising:

a processor;

a transceiver; and a memory storing a computer program executable by the processor;

wherein the processor is configured to:

determine a relay determination strategy of a terminal device according to state information of the terminal device; and determine a relay terminal device of the terminal device according to the relay determination strategy;

wherein the processor is further configured to:

determine that the relay determination strategy is that the relay terminal device satisfies a specified criterion in a case where the state information indicates that the terminal device is in an idle state;

wherein the specified criterion comprises at least one of:

a wireless channel quality of a sidelink between the relay terminal device and the terminal device being higher than a preset threshold; or a public land mobile network (PLMN) identifier of a serving cell of the relay terminal device being consistent with a PLMN identifier of a serving cell of the terminal device.

13. The communication device of claim 12, wherein the processor is further configured to:

perform a determination process of the relay terminal device at an access stratum; or perform a determination process of the relay terminal device at a non-access stratum according to transfer information of an access stratum; wherein the transfer information comprises at least one of: the state information, a serving cell of each terminal device, or a list of serving cells of each terminal device.

14. The communication device of claim 12, wherein the specified criterion is that the wireless channel quality of the sidelink between the relay terminal device and the terminal device is higher than the preset threshold, and the processor is further configured to:

calculate a wireless channel quality of a sidelink between a candidate terminal device and the terminal device; and determine a candidate terminal device whose wireless channel quality is higher than the preset threshold as the relay terminal device.

15. The communication device of claim 12, wherein the specified criterion is that the PLMN identifier of the serving cell of the relay terminal device is consistent with the PLMN identifier of the serving cell of the terminal device, the processor is further configured to:

acquire the PLMN identifier of the serving cell of the terminal device and a PLMN identifier of a serving cell of a candidate terminal device, and determine a candidate terminal device whose PLMN identifier of the serving cell is consistent with the PLMN identifier of the serving cell of the terminal device as the relay terminal device.

16. The communication device of claim 12, wherein the specified criterion is that the wireless channel quality of the sidelink between the relay terminal device and the terminal device is higher than the preset threshold and the PLMN identifier of the serving cell of the relay terminal device is consistent with the PLMN identifier of the serving cell of the terminal device, and the processor is further configured to:

calculate a wireless channel quality of a sidelink between a candidate terminal device and the terminal device;

acquire the PLMN identifier of the serving cell of the terminal device and a PLMN identifier of a serving cell of the candidate terminal device, and determine a candidate terminal device whose wireless channel quality is higher than the preset threshold and whose PLMN identifier of the serving cell is consistent with the PLMN identifier of the serving cell of the terminal device as the relay terminal device.

* * * * *